United States Patent
Hollmig

(10) Patent No.: US 10,384,550 B2
(45) Date of Patent: Aug. 20, 2019

(54) MOTOR VEHICLE WITH A CONNECTION DEVICE

(71) Applicant: AUDI AG, Ingolstadt (DE)

(72) Inventor: Ralph Hollmig, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/979,886

(22) Filed: May 15, 2018

(65) Prior Publication Data

US 2018/0334048 A1    Nov. 22, 2018

(30) Foreign Application Priority Data

May 22, 2017   (DE) ................. 10 2017 208 599

(51) Int. Cl.
| | |
|---|---|
| B60L 11/18 | (2006.01) |
| B62D 21/02 | (2006.01) |
| B62D 43/10 | (2006.01) |
| B60K 11/04 | (2006.01) |
| B62D 21/17 | (2006.01) |
| B60L 53/16 | (2019.01) |
| B60K 1/00 | (2006.01) |
| B60K 11/02 | (2006.01) |

(52) U.S. Cl.
CPC ............ *B60L 11/1818* (2013.01); *B60K 1/00* (2013.01); *B60K 11/02* (2013.01); *B60K 11/04* (2013.01); *B60L 53/16* (2019.02); *B62D 21/02* (2013.01); *B62D 21/17* (2013.01); *B62D 43/10* (2013.01); B60K 2001/003 (2013.01); B60Y 2306/05 (2013.01)

(58) Field of Classification Search
CPC ... B60L 53/16–18; B62D 21/17; B62D 21/02; B62D 43/10; B60K 11/04; B60Y 2306/05
See application file for complete search history.

(56) References Cited

U.S. PATENT DOCUMENTS

| | | | | |
|---|---|---|---|---|
| 4,904,205 A * | 2/1990 | Rice | ........................ | H01R 13/72 191/12.4 |
| 5,445,252 A * | 8/1995 | McKee | .................. | H02G 11/02 191/12 R |
| 5,540,312 A * | 7/1996 | Ogawa | .................... | B60L 53/18 191/12 R |
| 5,855,262 A * | 1/1999 | Jackson | .................. | H02G 11/02 191/12.4 |
| 5,923,147 A * | 7/1999 | Martensson | ....... | H01R 13/6675 320/111 |
| 9,136,684 B2 * | 9/2015 | Giles | ........................ | H02G 11/02 |
| 9,513,682 B2 * | 12/2016 | Fleisig | .................... | G06F 1/266 |

(Continued)

FOREIGN PATENT DOCUMENTS

| | | |
|---|---|---|
| DE | 102009016895 A1 | 10/2010 |
| DE | 102010045312 A1 | 3/2012 |

(Continued)

*Primary Examiner* — Erez Gurari

(74) *Attorney, Agent, or Firm* — Maier & Maier, PLLC

(57) ABSTRACT

A motor vehicle with a traction battery and a connection device. The traction battery can be connected to an energy source external to the vehicle for recharging. In this case, the connection device has an electrical charging cable and a rotatably mounted cable reel for taking up the charging cable. The charging cable be guided in a longitudinal beam of the motor vehicle configured as a hollow profile.

14 Claims, 1 Drawing Sheet

(56) References Cited

U.S. PATENT DOCUMENTS

| | | | |
|---|---|---|---|
| 10,199,781 B2* | 2/2019 | Deatherage | B65H 75/4426 |
| 2011/0139521 A1* | 6/2011 | Ichikawa | B65H 75/425 |
| | | | 180/65.1 |
| 2011/0245987 A1* | 10/2011 | Pratt | H01M 10/44 |
| | | | 700/295 |
| 2012/0228420 A1* | 9/2012 | Ichikawa | B60K 6/445 |
| | | | 242/398 |
| 2013/0206528 A1* | 8/2013 | Enning | H02G 11/02 |
| | | | 191/12.2 R |
| 2013/0249282 A1* | 9/2013 | Ishii | H02J 7/0055 |
| | | | 307/10.1 |
| 2013/0277484 A1* | 10/2013 | Ichikawa | H02G 11/02 |
| | | | 242/390.9 |
| 2014/0034382 A1* | 2/2014 | Mateski | H02G 11/02 |
| | | | 174/74 R |
| 2014/0216779 A1* | 8/2014 | Kinomura | B65H 75/4484 |
| | | | 174/79 |
| 2014/0305759 A1* | 10/2014 | Zuber | H02G 11/02 |
| | | | 191/12.2 R |
| 2014/0339352 A1* | 11/2014 | Iwami | B65H 75/40 |
| | | | 242/405 |
| 2015/0008878 A1* | 1/2015 | Mizuno | H02J 7/0042 |
| | | | 320/109 |
| 2017/0125993 A1* | 5/2017 | Krammer | H01B 7/0823 |
| 2017/0144557 A1* | 5/2017 | Werner | B60L 11/1818 |
| 2017/0151879 A1* | 6/2017 | Guillermin | B65H 75/425 |
| 2018/0334048 A1* | 11/2018 | Hollmig | B60L 11/1818 |

FOREIGN PATENT DOCUMENTS

| | | |
|---|---|---|
| DE | 102011121303 A1 | 6/2013 |
| DE | 10 2012 023 332 A1 | 6/2014 |
| EP | 0 537 065 B1 | 4/1993 |
| JP | 2013-99024 A | 5/2013 |

\* cited by examiner

MOTOR VEHICLE WITH A CONNECTION DEVICE

FIELD

The invention relates to a motor vehicle with a traction battery and a connection device, by means of which the traction battery can be connected to an energy source external to the vehicle for recharging.

BACKGROUND

From DE 10 2009 016 895 A1 there is known a charging connection device for an electrically propelled motor vehicle that has a charging cable and a cable roll-up mechanism. The cable reel here is pre-tensioned in a roll-up position, and when the charging cable is pulled out, the cable reel is unrolled from it against the pre-tensioning.

DE 10 2010 045 312 A1 describes an electric vehicle with a roll-up mechanism on which a charging cable, by way of which the vehicle can be connected to a stationary power grid, can be rolled up. The roll-up mechanism may be arranged beneath a paneling or bodywork component of the vehicle.

DE 10 2011 121 303 A1 relates to a motor vehicle with permanently installed charging cable on the vehicle side, which can be pulled out from a cable storage. The charging cable is guided in the cable storage from a fixed installation point along a substantially straight stretch to a deflection point, then deflected by an angle between 90° and 180° and guided along another substantially straight stretch to a connection plug.

The object of the present invention is to provide a motor vehicle with a charging cable arranged in a space-efficient manner and able to be safely and reliably manipulated.

SUMMARY

This object is achieved according to the invention by the subject matter of the independent patent claim. Advantageous embodiments of the invention are indicated in the dependent patent claims as well as in the following description and the drawings.

The motor vehicle according to the invention comprises a traction battery and a connection device, by means of which the traction battery can be connected to an energy source external to the vehicle for recharging. In this case, the connection device comprises an electrical charging cable and a rotatably mounted cable reel for taking up the charging cable. In order to achieve a space-efficient, i.e., space-saving arrangement as well as a safe and reliable handling of the charging cable, it is proposed according to the invention that the charging cable be guided in a longitudinal beam of the motor vehicle configured as a hollow profile. Thus, the charging cable is part of the motor vehicle, so that it is advantageously available at all times on the motor vehicle in order to produce an electrical connection to the energy source external to the vehicle. For this purpose, it may be pulled out or unwound, i.e., rolled out entirely or partly from the cable reel.

Depending on how far the charging cable is unwound from the cable reel or wound up on the cable reel, i.e., taken up on it, the charging cable will be found in different reeling or winding states. The guiding of the charging cable in the longitudinal beam means that at least one section of the charging cable always runs through the longitudinal beam, i.e., thus especially regardless of the winding state, i.e., it is situated in an interior space of the hollow profile. In particular, the charging cable may have a charging plug at its free end, i.e., the end not directly connected to the cable reel or the rest of the motor vehicle, and this plug serves as an electrical contact element with the energy source external to the vehicle. A section of the charging cable is then guided in the longitudinal beam extending between the charging plug and the cable reel. Which section this is in a concrete situation will depend each time on the particular winding state, since the charging cable will move during its winding up and unwinding relative to the longitudinal beam, so that different sections will thus end up inside and outside the interior space of the longitudinal beam.

In this case, the longitudinal beam may have two openings or recesses, through which the charging cable is guided into or out from the longitudinal beam. One or both of these openings or recesses may be disposed at an end face or on or in a side wall of the longitudinal beam. Thus, the charging cable may be guided in a partial segment of the longitudinal beam; thus, it need not be guided along the entire length of the longitudinal beam inside it.

In other words, the longitudinal beam serves as a cable duct by guiding the charging cable in its interior. In this way, a separate cable duct can be spared, advantageously resulting in cost and weight savings. Thanks to the stability of the longitudinal beam by virtue of its function, an especially secure guiding of the charging cable can be achieved. Furthermore, conflicts or contacts between the charging cable and other components as well as damage to the charging cable can be prevented. Since an inner side of the longitudinal beam can easily be configured especially smooth, the charging cable can advantageously be guided in an especially light, low-friction and damage-free manner, in particular when it is being wound up and unwound.

Since the longitudinal beam is usually formed of metal and thus has good thermal conductivity, it may advantageously serve as a cooling element for dissipating the heat arising in the section of the charging cable guided by it, in addition to its guiding function. Thanks to the rolled-up or wound-up arrangement and storage of the charging cable, the latter can be stowed in especially space-saving manner in the motor vehicle. In this way, advantageously a longer cable length may be provided, without the user of the motor vehicle having to reduce or limit, for example, the available trunk space of the motor vehicle. Thus, advantageously, a uniform cable length can be provided and used, which advantageously accomplishes an especially flexible usefulness of the charging cable. Thus, for example, the formerly customary offering or providing of charging cables of different length can be eliminated, without the user being restricted in his ability to use different charging stations or charging stations having different arrangements in regard to an assigned parking position.

In order to prevent the free end of the charging cable from being pulled into or through the longitudinal beam during the rolling up process, the charging plug may be dimensioned larger than an opening or recess of the longitudinal beam facing away from the cable reel.

The motor vehicle, for example, may be a vehicle with an electric motor or a hybrid vehicle. Advantageously in this case, due to the usually smaller internal combustion engine or no such engine being present as compared to conventional motor vehicles, the packing space which can be used for the cable reel is also available, outside of the trunk space of the motor vehicle.

In one advantageous enhancement of the present invention, the longitudinal beam is designed as a front longitudinal beam of the motor vehicle and the cable reel is arranged in a radiator tank of the motor vehicle. Thus, the charging cable may run or be guided from the front of the vehicle through the front longitudinal beam up to the radiator tank and the cable reel situated therein. Advantageously, by the guidance in the front longitudinal beam it is possible to avoid a conflict or contact of the charging cable with one of the many components usually present in this region of the vehicle. Thanks to its design, the radiator tank, which is at least protected against water spray, is especially suited to taking up or arranging of the cable reel and an electrical connection provided on or in the radiator tank between the charging cable and a charging infrastructure of the motor vehicle electrically connected directly or indirectly to the traction battery.

Likewise, in one advantageous enhancement of the present invention, the longitudinal beam may be formed a rear longitudinal beam of the motor vehicle and the cable reel can be arranged in a spare tire cavity of the motor vehicle. Thus, the charging cable may be guided out from the spare tire cavity through the rear longitudinal beam, for example, to a tail gate or a rear side part of the motor vehicle. The arrangement of the cable reel in the spare tire cavity is especially advantageous, since, because of its originally intended function—that of taking up a spare tire—this already has a substantially round shape in its basic structure, which advantageously corresponds to a round shape of the cable reel. The use of the spare tire cavity to take up or arrange the cable reel is at present advantageously possible in a particularly easy and space-saving manner, since oftentimes puncture-proof tires or other less space-intensive tire repair systems are used in place of a complete spare tire or wheel.

An arrangement of the cable reel beneath a rear seat bank of the motor vehicle or on the inside of a rear side paneling of the motor vehicle is likewise advantageously possible.

In another advantageous embodiment of the present invention, the connection device comprises a spring-loaded winding-up mechanism for the automatic winding up of the charging cable on the cable reel. It is proposed that the connection device also comprises a locking mechanism for the reversible releasable locking of the winding-up mechanism. Alternatively or additionally, the charging cable may be held in reversible releasable manner in various winding states by means of the locking mechanism. In other words, therefore, the user does not need to turn the cable reel manually in order to wind the charging cable onto it. The winding-up mechanism or the cable reel may be pre-tensioned by a spring element, so that the charging cable can be pulled out from a wound-up state against the spring tension or spring force and thereby be rolled off from the cable reel. If the free end of the charging cable is not being held by the user, by a connection to the energy source external to the vehicle or by the locking mechanism, the cable will be pulled in by the spring tension or spring force, i.e., ultimately by the winding-up mechanism, and wound up onto the cable reel.

Thanks to the locking mechanism, this automatic rolling up, i.e., winding up, can be prevented by the locking of the winding-up mechanism. For this, the locking mechanism may have, for example, a detent, a bolt or bar, a clasp, a brake, or the equivalent. For example, the locking mechanism may block a rotary movement of the cable reel and/or clamp a section of the charging cable situated in front of the cable reel, for example.

The mechanical energy needed for winding up the charging cable may advantageously be provided by the user by or during the pulling out of the charging cable. Thus, advantageously no activating of an electrical power supply is needed to pull in and wind up the charging cable, for example, after the charging of the traction battery has ended. At the same time, the locking mechanism may advantageously prevent the charging cable, the energy source external to the vehicle, and their connection during the charging process from being under mechanical strain or subjected to mechanical traction. Advantageously, the locking mechanism may likewise prevent the charging cable from unwinding from the cable reel accidentally, for example due to vibrations while driving and/or by the action of gravity or due to a traction force exerted by the energy source external to the vehicle during the charging process. Thus, advantageously it may be prevented that a section of the charging cable might lie on the ground and possibly get soiled during the charging process. The winding-up mechanism for example may be produced to be similar to known household appliance cord winding-up mechanisms, such as that for a vacuum cleaner.

In another advantageous embodiment of the present invention, the connection device comprises a motor-driven winding-up mechanism for the automatic winding up of the charging cable onto the cable reel. In other words, the charging cable may be automatically pulled in and wound up, without the user having to exert manual force for this. This can achieve for example greater comfort of use and easier handling of the charging cable. Likewise an especially safe and reliable rolling up of the charging cable can advantageously be achieved thanks to a uniform wind-up speed. The motor drive unit may also advantageously ensure a reliable and uniform functioning of the winding-up mechanism for a lengthy period of time and for many wind-up processes.

In particular, the motor driven winding-up mechanism can also advantageously assist the rolling off or unwinding of the charging cable from the cable reel, i.e., the pulling out of the charging cable. For this purpose, the cable reel may be driven contrary to the direction of rotation used during the winding-up process. In this way, the effort of the user may be eased and thus the handling of the charging cable is simpler. Charging cables with oversized conductor cross sections and/or lengths may have a substantial weight, which therefore does not need to be moved by muscular effort alone during the unwinding from the cable reel.

In another advantageous embodiment of the present invention, the motor vehicle has a thermally conductive cooling mechanism connected to the cable reel. The cooling mechanism may preferably comprise a circulation of coolant. In other words, the cable reel is thus thermally coupled to the cooling mechanism, so that heat can be dissipated from the cable reel by means of the cooling mechanism. This may be especially advantageous, particularly when a portion of the charging cable is wound up on the cable reel during the charging of the traction battery. In such a case, heat may arise particularly in regions of the wound-up portion of the charging cable situated near the cable reel, and this heat cannot be given off efficiently in the direction away from the cable reel. Thus, the cooling mechanism can advantageously prevent a thermal damaging of the charging cable and/or the cable reel and—especially when the charging cable is at least partly wound up—the using of higher charging power. For example, the cooling mechanism may comprise cooling fins connected in a heat conductive manner to the cable reel, a radiator connected in a heat conductive manner to the cable reel and/or a thermal conduction element that couples the cable reel in a heat conductive manner, i.e., thermally, to a frame or bodywork part of the motor vehicle. In addition or alternatively, the cooling mechanism may comprise a pipeline through which a coolant flows, especially a cooling liquid, which passes through the cable reel, for example, along an axis about which the cable reel rotates during the winding up of the charging cable. The pipeline may be formed by a cylindrically shaped wall of the cable reel, for example, which delimits a cavity passing through the cable reel.

In another advantageous embodiment of the present invention, the motor vehicle has a thermally conductive cooling mechanism coupled to the charging cable, which may preferably comprise a circulation of coolant. In other words, the heat arising in the charging cable can be dissipated from the charging cable by means of the cooling mechanism. This may advantageously prevent a thermal damaging of the charging cable and possibly the using of higher charging power. The cooling mechanism may serve for cooling both the charging cable and for cooling the cable reel. The cooling mechanism may also be composed of several parts. For example, the cooling mechanism may comprise a fan, which subjects the charging cable to a flow of cooling air. For an efficient and effective cooling of the charging cable, this may be connected in heat conductive manner to the cooling mechanism.

In one advantageous enhancement it is proposed that the charging cable can accept a flow of liquid and is connected to the circulation of coolant of the motor vehicle. Thus, the charging cable can receive a flow of a cooling liquid or a coolant along its lengthwise direction of extension. The circulation of coolant may also be provided or used for example for the cooling of the traction battery. Thanks to such a liquid cooling of the charging cable, an especially effective heat transport can be accomplished, making possible especially high charging power without thermal damage to the charging cable. The charging cable, for example, can be designed to receive a flow of liquid in that it has a jacket element, which encloses an interior or hollow region extending along the longitudinal direction of the charging cable in liquid-tight manner, except for respective through openings provided for the connection to the circulation of coolant. Current-carrying parts of the charging cable may thus be electrically insulated from this interior region receiving or able to receive such a flow.

Especially advantageously, an end of the charging cable facing the cable reel may be connected to the cable reel and/or arranged on a through opening of the cable reel leading to an interior region of the cable reel. This may advantageously enable an especially easy connecting of this end of the charging cable to the circulation of coolant and/or to an electrical system of the motor vehicle by guiding the corresponding connections or lines through the interior region of the cable reel to the through opening. In this way, the cable reel may rotate about these connections during the winding-up and unwinding of the charging cable, without there being any spatial conflict with the charging cable.

In another advantageous embodiment of the present invention, the motor vehicle has a retaining mechanism for holding a charging plug of the charging cable in a stowed position. From the retaining mechanism and the stowed position, the charging plug may be removed for connecting to the energy source external to the vehicle. Thanks to the retaining mechanism, the charging plug may thus be secured or arrested as needed. In this way, an unintentional roll-up or roll-out of the charging cable as well as an unintentional moving around of the charging plug can be advantageously prevented. The retaining mechanism and thus also the stowed position may preferably be situated inside a silhouette of the motor vehicle on an outer wall of the motor vehicle. Advantageously, the charging plug may thus be kept accessible from outside the motor vehicle. Preferably, the retaining mechanism and thus also the charging plug are covered in the stowed position by a swiveling flap, hatch or the like—similar to the gas tank cap of a conventional motor vehicle.

The term charging plug should be interpreted broadly in the sense of the present invention and may encompass, for example, a male and/or a female part of a plug connection. Alternatively to the charging plug, any given electrical contact element for the electrical connection of the charging cable to the energy source external to the vehicle may be arranged at the free end of the charging cable. This contact element may be connected to the energy source external to the vehicle not only by means of a plug connection, but also for example by means of a screw connection or some other kind of connection.

BRIEF DESCRIPTION OF DRAWINGS

In the following, exemplary embodiments of the invention shall be described. For this, there are shown.

The exemplary embodiments explained below are preferred embodiments of the invention. In the exemplary embodiments, the described components of the embodiments each time represent individual, separately considered features of the invention, which further develop the invention independently of each other and therefore are to be viewed individually or in any other combination than the one shown as being part of the invention. Furthermore, the described embodiments may also be supplemented by other of the already described features of the invention.

In the figures, elements of identical function are provided with the same reference numbers.

DETAILED DESCRIPTION

Figure 1:
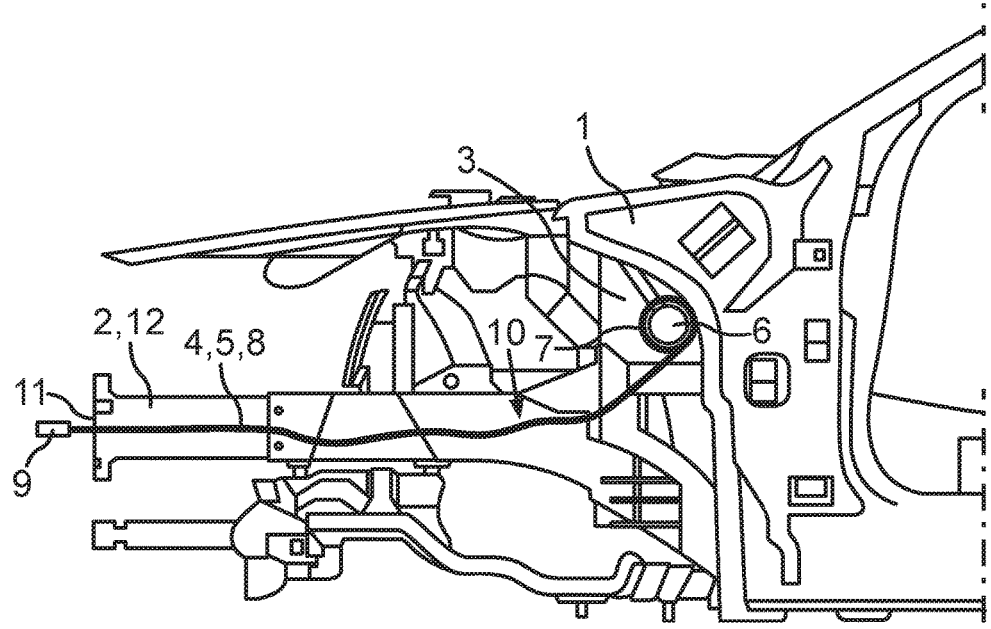
FIG. 1 a schematic and excerpted lateral view of a front region of a vehicle structure with a front longitudinal beam, through which a charging cable is guided.

FIG. 1 shows a schematic and excerpted lateral view of a front region of a frame and bodywork structure of a motor vehicle 1. The structure or the motor vehicle 1 comprises a front longitudinal beam 2 extending in the lengthwise direction of the vehicle as well as a radiator tank 3, which is arranged as usual at the front end in front of a passenger compartment of the motor vehicle 1. In the present instance, the motor vehicle 1 furthermore has a connection device 4, comprising a charging cable 5 and a rotary mounted cable reel 6. A piece of the charging cable 5 is wound up in the present case on the cable reel 6 and shall therefore be called the rolled-up section 7 in the following. Another piece of the charging cable, which is not rolled up on the cable reel 6, shall be called the unrolled section 8. The cable reel 6 is mounted firmly on the vehicle and connected to the charging cable 5 in such a way that the cable cannot be removed completely from the cable reel 6 by unwinding or rolling off. The connection device 4 is thus part of the motor vehicle 1.

At a free end of the charging cable 5 facing away from the cable reel 6 there is provided a charging plug 9, which serves for making an electrical contact between the charging cable and an energy source external to the vehicle, such as a charging station. On the vehicle side, the charging cable 5 is electrically connected to a traction battery of the motor vehicle 1, not shown here, so that it can be charged via the charging cable 5.

Contrary to this arrangement, it is often provided at present that a cable not secured to the vehicle is used for the connecting of a vehicle to the charging station. For example, separate cables with lengths of 2.5 m or 7 m are offered for this. The drawback is that, when not in use, the cable needs to be carried along or stowed for example in a trunk, which reduces the usable trunk space. Furthermore, such separate cables often do not have the optimal length for connecting the vehicle to the respective charging station, without the cable lying on the ground outside the vehicle, for example, or being placed under mechanical tensile load.

The connection device 4 fixed to the vehicle which is presently proposed has the benefit that an external cable handling is no longer necessary and in each case, an optimally fitting length of the charging cable 5 is pulled out, i.e., can be unwound from the cable reel 6, even for different distances or different relative arrangements between the motor vehicle 1 and the particular charging station.

So that no trunk space is occupied by this charging cable 5, which is nevertheless always carried along as part of the motor vehicle 1, it is proposed to arrange the cable reel 6 [in] the radiator tank 3.

In one region or piece of the front longitudinal beam 2 configured as a hollow profile there is provided a through opening 10. The charging cable 5 is guided out from the cable reel 6 through this through opening 10 into an interior space of the front longitudinal beam 2. Moreover, the unrolled section 8 is guided in the front longitudinal beam 2 in the direction of the front of the motor vehicle 1.

The charging cable 5 for example may be guided out at an end face 11 from the front longitudinal beam 2. Alternatively, for example, a recess may be provided in a side wall 12 of the front longitudinal beam 2, through which the charging cable 5 can be guided. Advantageously, an opening for the charging cable 5 provided in the end face 11 or the side wall 2 can be dimensioned such that the charging plug 9 cannot be pulled [back] through it into the interior region of the front longitudinal beam 2. In addition or alternatively, an additional structural element may be provided for this, which covers an interior region of the motor vehicle 1, i.e., hidden from the user, who manipulates the charging plug 9 from outside the motor vehicle 1 for the connection to the charging station.

The charging plug 9 in the present case may be guided to the outside, for example, in the region of a radiator grille of the motor vehicle 1. Preferably, when not in use, it can be secured in a stowed position in a retaining mechanism provided there.

For the cooling of the charging cable 5, the motor vehicle 1 may have a cooling mechanism, not shown here.

Figure 2:
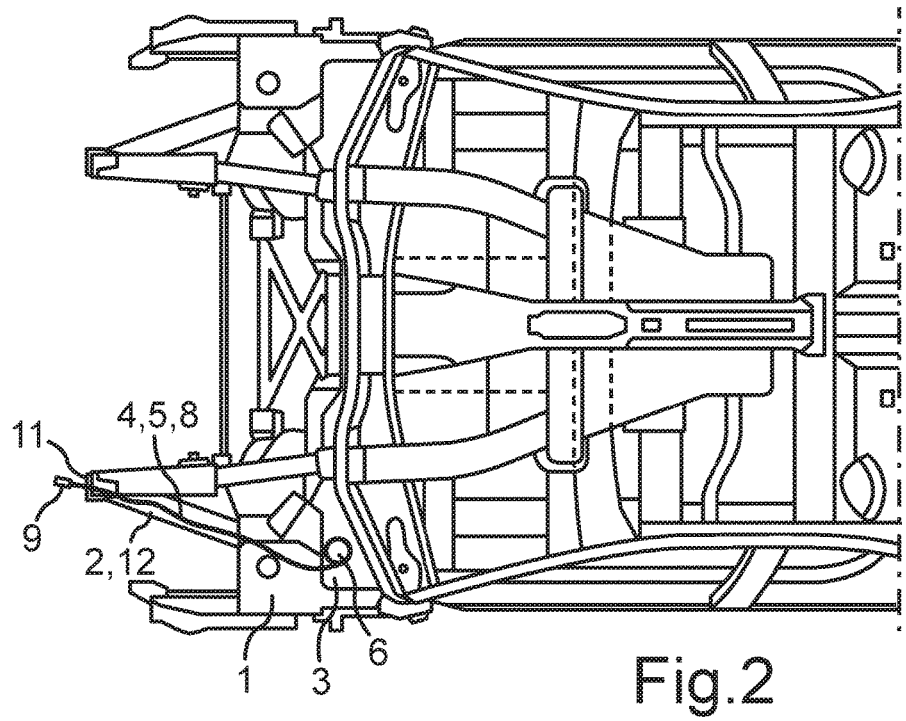
FIG. 2 a schematic top view of the vehicle structure of FIG. 1.

FIG. 2 shows a schematic top view of the structures and components already represented in FIG. 1. Thus, the same explanation given in connection with FIG. 1 applies accordingly.

Unlike what is represented here, it is likewise possible to guide the charging cable 5 through a rear longitudinal beam of the motor vehicle 1. In this case, the cable reel 6 may be arranged, for example, in a spare tire cavity, beneath a rear seat bank, in a side pocket or on the inside on a rear side paneling of the motor vehicle 1.

On the whole, the examples show how a motor vehicle 1 can be provided according to the invention with a safely and reliably manipulated charging cable 5 in a space-efficient arrangement.

The invention claimed is:

1. A motor vehicle comprising:
a traction battery and a connection device, by which the traction battery can be connected to an energy source external to the vehicle for recharging, wherein the connection device includes an electrical charging cable and a rotatably mounted cable reel for taking up the charging cable, wherein the charging cable is guided in a longitudinal beam of the motor vehicle configured as a hollow profile, wherein the longitudinal beam is designed as a front longitudinal beam and the cable reel is arranged in a radiator tank of the motor vehicle.

2. The motor vehicle as claimed in claim 1, wherein the connection device includes a spring-loaded winding-up mechanism for the automatic winding up of the charging cable on the cable reel and a locking mechanism for the reversible releasable locking of the winding-up mechanism and/or for the reversible releasable retaining of the charging cable in various winding states.

3. The motor vehicle as claimed in claim 1, wherein the connection device includes a motor-driven winding-up mechanism for the automatic winding of the charging cable onto the cable reel.

4. The motor vehicle as claimed in claim 1, wherein the motor vehicle has a heat conductive cooling mechanism connected to the cable reel, preferably comprising a circulation of coolant.

5. The motor vehicle as claimed in claim 1, wherein the motor vehicle has a heat conductive cooling mechanism connected to the charging cable, preferably comprising a circulation of coolant.

6. The motor vehicle as claimed in claim 5, wherein the charging cable can accept a flow of liquid and is connected to the circulation of coolant of the motor vehicle.

7. The motor vehicle as claimed in claim 1, wherein the motor vehicle has a retaining mechanism for holding a charging plug of the charging cable in a stowed position, from which the charging plug may be removed for connecting to the energy source external to the vehicle.

8. A motor vehicle comprising:
a traction battery and a connection device, by which the traction battery can be connected to an energy source external to the vehicle for recharging, wherein the connection device includes an electrical charging cable and a rotatably mounted cable reel for taking up the charging cable, wherein the charging cable is guided in a longitudinal beam of the motor vehicle configured as a hollow profile, wherein the longitudinal beam is designed as a rear longitudinal beam and the cable reel is arranged in a spare tire cavity of the motor vehicle.

9. The motor vehicle as claimed in claim 8, wherein the connection device includes a spring-loaded winding-up mechanism for the automatic winding up of the charging cable on the cable reel and a locking mechanism for the reversible releasable locking of the winding-up mechanism and/or for the reversible releasable retaining of the charging cable in various winding states.

10. The motor vehicle as claimed in claim 8, wherein the connection device includes a motor-driven winding-up mechanism for the automatic winding of the charging cable onto the cable reel.

11. The motor vehicle as claimed in claim 8, wherein the motor vehicle has a heat conductive cooling mechanism connected to the cable reel, preferably comprising a circulation of coolant.

12. The motor vehicle as claimed in claim 8, wherein the motor vehicle has a heat conductive cooling mechanism connected to the charging cable, preferably comprising a circulation of coolant.

13. The motor vehicle as claimed in claim 12, wherein the charging cable can accept a flow of liquid and is connected to the circulation of coolant of the motor vehicle.

14. The motor vehicle as claimed in claim 8, wherein the motor vehicle has a retaining mechanism for holding a charging plug of the charging cable in a stowed position, from which the charging plug may be removed for connecting to the energy source external to the vehicle.

* * * * *